US012596080B2

(12) United States Patent
Li et al.

(10) Patent No.: US 12,596,080 B2
(45) Date of Patent: Apr. 7, 2026

(54) VISION INSPECTION SYSTEMS AND METHODS USING LIGHT SOURCES OF DIFFERENT WAVELENGTHS

(71) Applicant: GM GLOBAL TECHNOLOGY OPERATIONS LLC, Detroit, MI (US)

(72) Inventors: Guangze Li, Novi, MI (US); Brian Fischer, Royal Oak, MI (US); Hui-ping Wang, Troy, MI (US); Jorge F. Arinez, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 158 days.

(21) Appl. No.: 18/415,016

(22) Filed: Jan. 17, 2024

(65) Prior Publication Data

US 2025/0231122 A1 Jul. 17, 2025

(51) Int. Cl.
*G01N 21/956* (2006.01)
*G01N 21/88* (2006.01)

(52) U.S. Cl.
CPC ... *G01N 21/95684* (2013.01); *G01N 21/8806* (2013.01); *G01N 21/8851* (2013.01);
(Continued)

(58) Field of Classification Search
CPC ... G01N 2021/8838; G01N 2021/8845; G01N 2021/8867; G01N 21/8806;
(Continued)

(56) References Cited

U.S. PATENT DOCUMENTS 7,126,699 B1 * 10/2006 Wihl .................. G01B 11/0608
356/625
8,045,145 B1 * 10/2011 Bakker ............ G01N 21/95607
356/237.1
(Continued)

FOREIGN PATENT DOCUMENTS

DE 102018105060 B3 5/2019
DE 102017130909 A1 6/2019
DE 102018211913 A1 1/2020

OTHER PUBLICATIONS

German Office Action from counterpart DE1020241060875, dated Oct. 11, 2024.
U.S. Appl. No. 17/944,543, filed Sep. 14, 2022, Li et al.

*Primary Examiner* — Tri T Ton

(57) ABSTRACT

A system includes a station to support a workpiece having one or more welds and/or surface features, and first and second vision sensing assemblies. The first assembly is configured to illuminate the workpiece and generate an image of the one or more welds and/or surface features. The first assembly includes a first light source configured to emit light having a first wavelength and a first sensor configured to detect the light having the first wavelength reflected by the workpiece. The second assembly is configured to illuminate the workpiece and generate an image of the one or more welds and/or surface features. The second assembly includes a second light source configured to emit light having a second wavelength and a second sensor configured to detect the light having the second wavelength reflected by the workpiece. Other example systems and methods are also disclosed.

20 Claims, 5 Drawing Sheets

(52) U.S. Cl.
CPC ................ *G01N 2021/8838* (2013.01); *G01N 2021/8845* (2013.01); *G01N 2021/8867* (2013.01)

(58) Field of Classification Search
CPC ......... G01N 21/8851; G01N 21/95684; G01N 1/00; G01N 3/00; G01N 5/00; G01N 7/00; G01N 9/00; G01N 11/00; G01N 13/00; G01N 15/00; G01N 17/00; G01N 19/00; G01N 21/00; G01N 22/00; G01N 23/00; G01N 24/00; G01N 25/00; G01N 27/00; G01N 29/00; G01N 30/00; G01N 31/00; G01N 33/00; G01N 35/00; G01N 37/00; G01N 2201/00; G01N 2203/00; G01N 2223/00; G01N 2291/00; G01N 2333/00; G01N 2400/00; G01N 2405/00; G01N 2407/00; G01N 2410/00; G01N 2415/00; G01N 2430/00; G01N 2440/00; G01N 2446/00; G01N 2458/00; G01N 2469/00; G01N 2470/00; G01N 2474/00; G01N 2496/00; G01N 2500/00; G01N 2510/00; G01N 2520/00; G01N 2550/00; G01N 2560/00; G01N 2570/00; G01N 2600/00; G01N 2610/00; G01N 2650/00; G01N 2800/00
See application file for complete search history.

(56) References Cited

U.S. PATENT DOCUMENTS

2007/0090280 A1*  4/2007  Harding ............ G01B 11/2509
                                                250/225
2023/0419471 A1*  12/2023  Schleith ................ H04N 23/56
2024/0183655 A1*  6/2024  Von Finck .......... G01B 11/303

* cited by examiner

400

1

VISION INSPECTION SYSTEMS AND METHODS USING LIGHT SOURCES OF DIFFERENT WAVELENGTHS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to vision inspection systems and methods, and more particularly to vision inspection systems and methods using light sources of different wavelengths for obtaining images for inspecting welds and/or surface features (e.g., laser welds, arc welds, electron beam welds, adhesive beads, textured surfaces, etc.).

Welds can be used to join two or more components in automotive and other applications. Laser welds can have a width as narrow as 1 mm and a concavity as deep as 3 mm-6 mm. Inspection systems are sometimes used to analyze the welds.

SUMMARY

A vision inspection system for welds and/or surface features includes a scanning station to support a workpiece including one or more welds and/or surface features, a first vision sensing assembly, and a second vision sensing assembly. The first vision sensing assembly is configured to illuminate the workpiece and generate an image of the one or more welds and/or surface features of the workpiece. The first vision sensing assembly includes a first light source configured to emit light having a first wavelength towards the workpiece and a first sensor configured to detect the light having the first wavelength reflected by the workpiece. The second vision sensing assembly is configured to illuminate the workpiece and generate an image of the one or more welds and/or surface features of the workpiece. The second vision sensing assembly includes a second light source configured to emit light having a second wavelength towards the workpiece and a second sensor configured to detect the light having the second wavelength reflected by the workpiece. The second wavelength is different than the first wavelength.

In other features, the first light source and the second light source are positioned adjacent to each other.

In other features, a distance between the first light source and the second light source is a fixed value of ten millimeters or less.

In other features, the first light source and the second light source are positioned in a plane extending parallel to the workpiece.

In other features, the first light source is a laser configured to emit electromagnetic radiation at the first wavelength.

In other features, the laser is a blue laser.

In other features, the first sensor includes a camera.

In other features, the first sensor includes a filter configured to allow only light at the first wavelength to pass therethrough.

In other features, the laser is a first laser and the second light source is a second laser configured to emit electromagnetic radiation at the second wavelength.

In other features, the second laser is a red laser.

In other features, the second sensor includes a camera.

In other features, the second sensor includes a filter configured to allow only light at the second wavelength to pass therethrough.

In other features, the vision inspection system further includes a control module in communication with the first vision sensing assembly and the second vision sensing assembly. The control module is configured to control the first light source and the second light source to turn on at the same time.

In other features, the control module is configured to combine image data from the first sensor and image data from the second sensor based on a relative velocity between the workpiece and the first vision sensing assembly and the second vision sensing assembly, and a distance between the first light source and the second light source.

In other features, the vision inspection system further includes a robotic arm mounted to the first vision sensing assembly and the second vision sensing assembly. The robotic arm is configured to move the first vision sensing assembly and the second vision sensing assembly over the one or more welds and/or surface features of the workpiece.

In other features, the vision inspection system further includes a conveyor configured to move the workpiece into a field of view of the first vision sensing assembly and the second vision sensing assembly.

A method for inspecting welds and/or surface features using a first vision sensing assembly and a second vision sensing assembly is disclosed. The first vision sensing assembly includes a first light source and a first sensor and the second vision sensing assembly includes a second light source and a second sensor. The method includes illuminating a workpiece including one or more welds and/or surface features with light emitted from the first light source having a first wavelength, illuminating the workpiece with light emitted from the second light source having a second wavelength different than the first wavelength, generating a first image with the first sensor based on the light having the first wavelength, generating a second image with the second sensor based on the light having the second wavelength, and combining the first image generated by the first sensor and the second image generated by the second sensor.

In other features, the first light source is a laser configured to emit light at the first wavelength, the second light source is a laser configured to emit light at the second wavelength, the first sensor includes a camera, and the second sensor includes a camera.

In other features, the method further includes filtering, via a first filter, the light emitted at the first wavelength, and filtering, via a second filter, the light emitted at the second wavelength.

In other features, combining the first image generated by the first sensor and the second image generated by the second sensor includes combining the first image and the second image based on a relative velocity between the workpiece and the first vision sensing assembly and the second vision sensing assembly, and a distance between the first light source and the second light source.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Welds can be used to join components in various applications including automotive applications. In such examples, inspection systems may be employed to capture machine vision images of the welds and then analyze the welds. The quality of the captured images may be affected by different conditions. For example, the quality of 3D surfaces, such as laser weld surfaces, may be affected by high surface gradients or undulation due to concavity or bulging. In such examples, the concavity of the surfaces may generate signal-deprived areas, such as occlusion or shadowing, in the image data. Additionally, in some examples, the quality of surfaces may be affected by the material type of the welded components. For instance, depending on the material, high reflectivity and low absorption ratios of material surfaces to emitted light from the inspection systems may occur, thereby possibly resulting in missing data for the images. As one example, a weld surface associated with a busbar (e.g., in an electric vehicle battery pack) may contain pinholes and spatter, which can cause missing image data. In such examples, the busbar material can be aluminum or copper, which have different reflectivity to common emitted lights (e.g., laser lights of blue, green, and red colors).

The vision inspection systems and methods according to the present disclosure provide solutions for obtaining high quality imaging for weld and/or surface feature analysis and inspection by using at least two vision sensing assemblies with light sources of different light wavelengths so that vision sensors in the assemblies can compensate each other in terms of visibility and reflectivity. In doing so, the solutions overcome the challenges explained above caused by visibility of weld morphology and reflectivity of material of interests.

Figure 1:
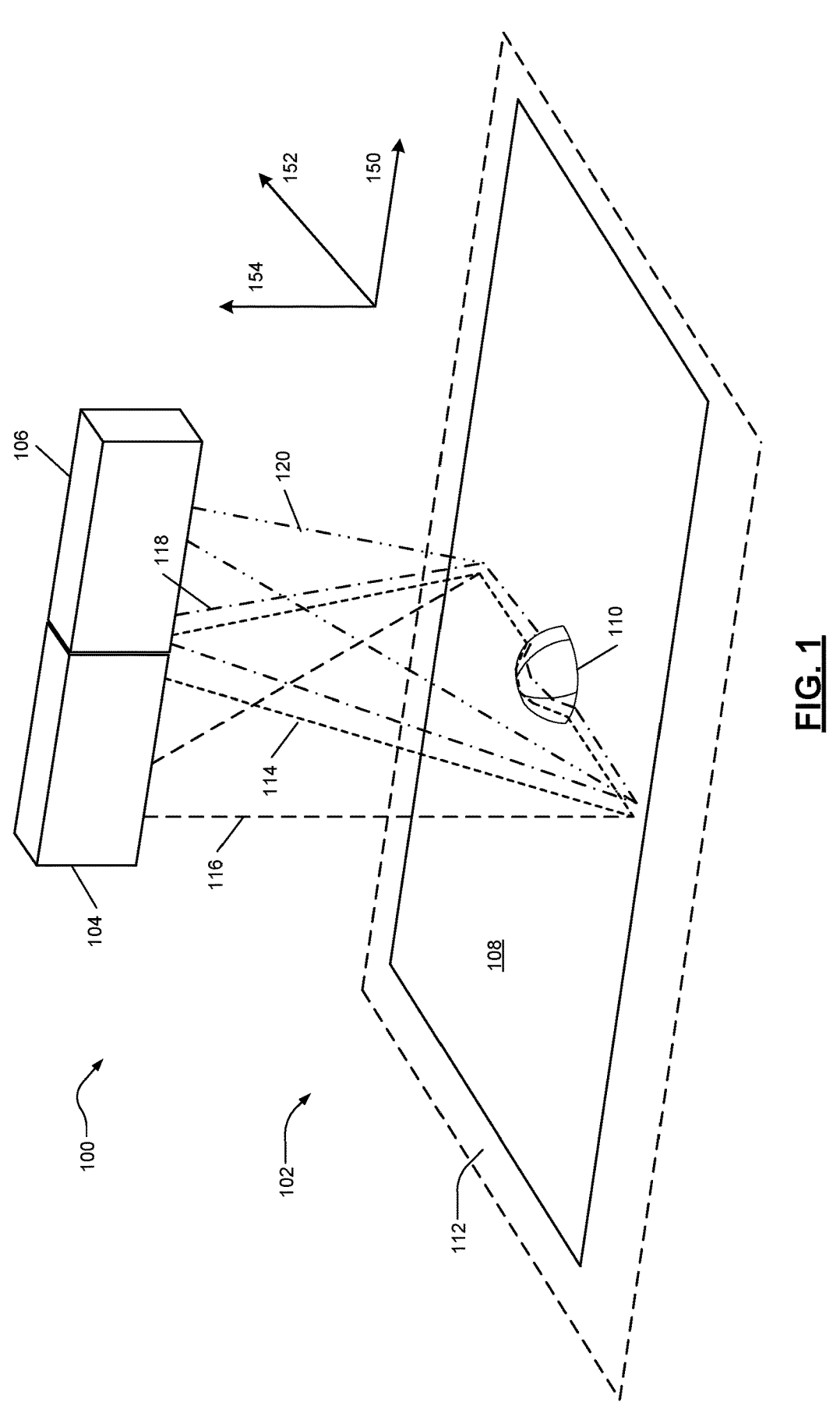
FIG. 1 is a functional block diagram of an example vision inspection system including two vision sensing assemblies with light sources of different light wavelengths, according to the present disclosure.

Referring now to FIG. 1, a block diagram of an example vision inspection system 100 is presented for laser welds. While the vision inspection system 100 of FIG. 1 and/or other systems herein are described with respect to laser welds, it should be appreciated that the systems herein may be applicable in other types of welds and/or surface features, such as arc welds, electron beam welds, adhesive beads, textured surfaces, etc. Additionally, the vision inspection system 100 and/or other systems herein may be applicable in the inspection of welds in any suitable application, such as automotive applications.

As shown in FIG. 1, the vision inspection system 100 generally includes a scanning station 102 and two vision sensing assemblies 104, 106. The scanning station 102 includes a platform 112 to support a workpiece 108 having one or more laser welds and/or surface features 110. In various embodiments, the surface features 110 may include, for example, pinholes, spatters, and/or some surface variations in the workpiece 108. In the example of FIG. 1, one surface feature is shown as a dome-like shape. Each vision sensing assembly 104, 106 illuminates the workpiece 108 and generates an image of the one or more laser welds and/or surface features 110 of the workpiece 108. For example, as shown in FIG. 1, each vision sensing assembly 104, 106 emits light from a projection window towards the workpiece 108 (e.g., the laser welds and/or surface features 110) and detects light reflected from the workpiece 108 (e.g., the laser welds and/or surface features 110). Each vision sensing assembly 104, 106 and/or a control module in communication with the vision sensing assemblies 104, 106 may then generate an image (e.g., a 3D surface depth map image, etc.) based on the reflected light, as further explained herein.

In the example of FIG. 1, the vision sensing assemblies 104, 106 emit light at different wavelengths. For instance, the vision sensing assembly 104 may emit light at one wavelength corresponding to a color, and the vision sensing assembly 106 may emit light at a different wavelength corresponding to another color. In such examples, the color (and therefore the wavelength) may be selected based on, for example, a type of material of the workpiece 108. Then, each vision sensing assembly 104, 106 may detect only the reflected light corresponding to the emitted light at the respective wavelength, as further explained below. For instance, the vision sensing assembly 104 may detect only red light if the assembly emits red light, and the vision sensing assembly 106 may detect only blue light if the assembly emits blue light.

The workpiece 108 of FIG. 1 and/or any other workpiece herein may be any suitable welded component. For example, the workpiece 108 may be a bus bar (e.g., having pinholes and spatter) or another welded component. In such examples, the workpiece 108 may be a component for a vehicle. While the workpiece 108 of FIG. 1 is shown as being a generally dome-like shape, it should be appreciated that the workpiece 108 may have any suitable shape and/or dimensions.

In the example of FIG. 1, the workpiece 108 is generally positioned in the field of view of both vision sensing assemblies 104, 106. For example, the vision sensing assemblies 104, 106 are generally located in a plane parallel to and above the workpiece 108 (relative to the z direction as represented by an arrow 154). With this configuration, the vision sensing assembly 104 includes an emitted light field of view 114 directed towards the workpiece 108 as represented by lines with short dash configuration and a detection field of view 116 directed towards the workpiece 108 as represented by lines with long dash configuration. Similarly, the vision sensing assembly 106 includes an emitted light field of view 118 directed towards the workpiece 108 as represented by lines with a dash-dot-dash configuration and a detection field of view 120 directed towards the workpiece 108 as represented by lines with a dash-dot-dot-dash configuration.

In such examples, the workpiece 108 may be positioned in the field of view of the vision sensing assemblies 104, 106 by moving the workpiece 108 and/or the vision sensing assemblies 104, 106. For example, the platform 112 supporting the workpiece 108 may be dynamic or stationary. If dynamic, the platform 112 may be a conveyor to move the workpiece 108 supported thereon relative to the vision sensing assemblies 104, 106, as further explained below. In such examples, the platform 112 may move the workpiece 108 in any suitable direction, such as the x direction as represented by an arrow 150, the y direction as represented by an arrow 152, etc. In other examples, the platform 112 may be generally static and the vision sensing assemblies 104, 106 may be moved (e.g., via one or more robotic arms, etc.) relative to the workpiece 108 on the platform 112, as further explained below.

In either case, both vision sensing assemblies 104, 106 cover a region of interest associated with the workpiece 108. For example, the vision sensing assemblies 104, 106 project light and detect light reflected from the workpiece 108 across a region of the workpiece 108 that is intended for inspection. In such examples, the region of interest may include a surface of the workpiece 108 and/or portions within the workpiece 108 (e.g., within the outer surface of the workpiece 108).

Figure 2:
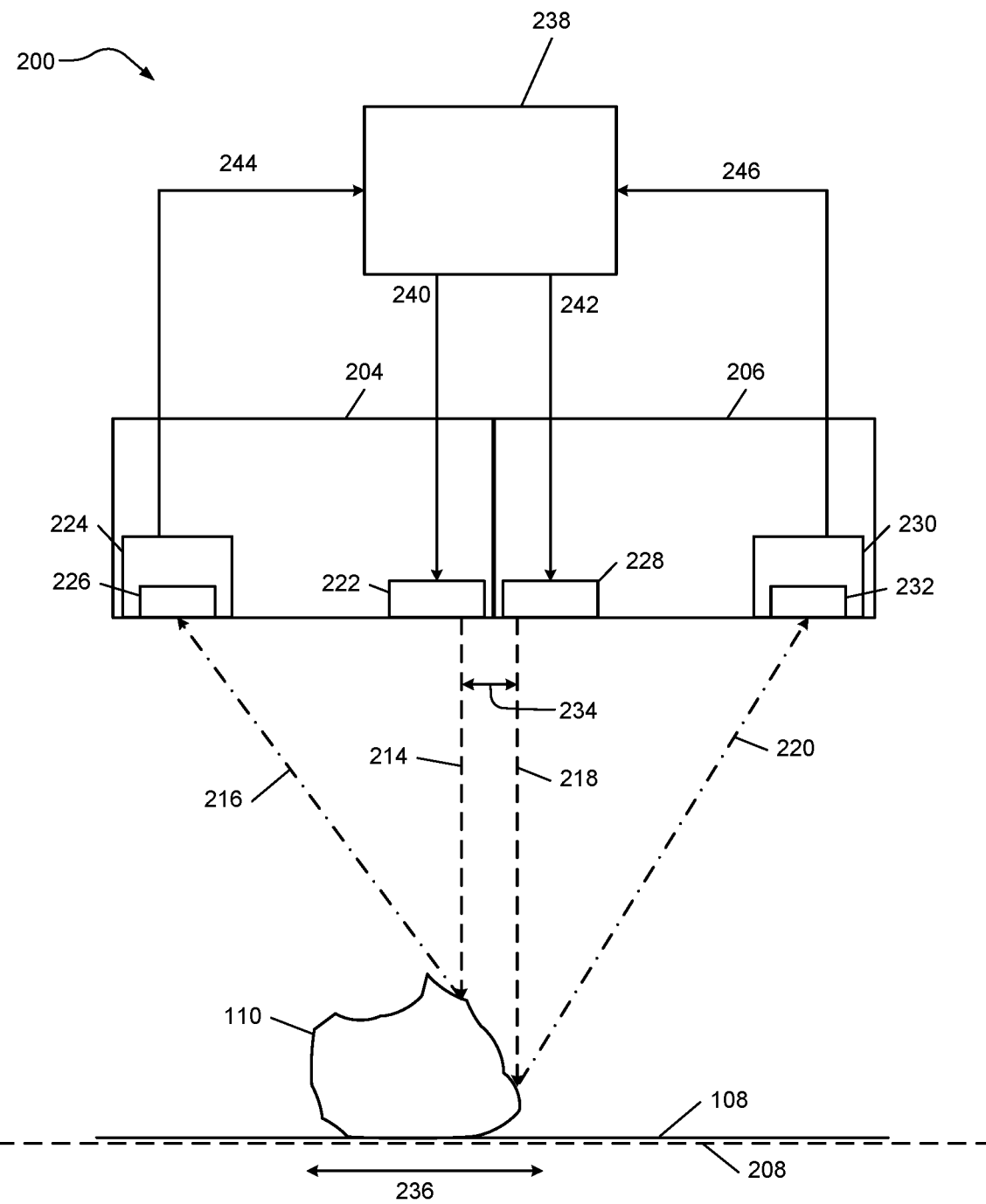
FIG. 2 is a functional block diagram of another example vision inspection system including two vision sensing assemblies and a movable conveyor, according to the present disclosure.

FIG. 2 depicts an example vision inspection system 200 similar to the vision inspection system 100 of FIG. 1 but includes additional components. For example, the vision inspection system 200 includes vision sensing assemblies 204, 206, such as laser profilers, that emit light at different wavelengths towards the workpiece 108 (e.g., the surface features 110) and detect light reflected from the workpiece 108 (e.g., the surface features 110), as explained above relative to the vision sensing assemblies 104, 106 FIG. 1.

More specifically, the vision sensing assemblies 204, 206 include light sources 222, 228, respectively. In the example of FIG. 2, the light sources 222, 228 are lasers for emitting electromagnetic radiation. For example, the light source 222 may project a laser line 214 and the light source 228 may project a laser line 218, as shown in FIG. 2.

In the example of FIG. 2, the light sources 222, 228 emit light at different wavelengths. For example, the light source 222 of the vision sensing assembly 204 may be a blue laser emitting light at a wavelength in the range between about 400 nanometers (nm) and about 500 nm (e.g., at 405 nm, 450 nm, 458 nm, 488 nm, etc.). Additionally, the light source 228 of the vision sensing assembly 206 may be a red laser emitting light at a wavelength in the range between about 600 nm and about 810 nm (e.g., at 638 nm, 650 nm, 670 nm, 808 nm, etc.). In other examples, the light sources 222, 228 may be other suitable types of light emitting different wavelengths, including other suitable types of lasers (e.g., a green laser, etc.).

As shown in FIG. 2, the vision sensing assemblies 204, 206 also include sensors 224, 230, respectively. In this example, the sensors 224, 230 are cameras or any other suitable types of devices for detecting light 216, 220 reflected by the workpiece 108 (e.g., the surface features 110). For instance, the workpiece 108 (e.g., the surface features 110) may cause distortion in the laser lines 214, 218, which can be detected and recorded by the cameras. For example, in various embodiments, some of the emitted light from each light source 222, 228 is reflected off of the workpiece 108 and some of the emitted light is absorbed by the emitted light depending on the material type of the workpiece 108, the color of the workpiece 108, the color (e.g., the wavelength) of the emitted light, etc.

In some examples, the sensors 224, 230 detect the reflected light 216, 220 at the wavelengths associated with the light sources 222, 228. For example, the sensor 224 of the vision sensing assembly 204 may detect reflected light at the wavelength associated with the light source 222. Additionally, the sensor 230 of the vision sensing assembly 206 may detect reflected light at the wavelength associated with the light source 228.

In various embodiments, the vision sensing assemblies 204, 206 may detect only reflected light at a particular wavelength or range of wavelengths. For example, and as shown in FIG. 2, the vision sensing assemblies 204, 206 may include filters 226, 232, respectively, for filtering light emitted at the particular wavelengths, thereby allowing only light at the particular wavelengths to pass therethrough. For example, if the light source 222 is a blue laser emitting light at a wavelength of 450 nm, the filter 226 may filter out light at different wavelengths (e.g., between 600 nm and 810 nm, etc.). In other words, the filter 226 allows only light at the wavelength of 450 nm (or within a defined distance above/below 450 nm) to pass to the sensor 224. The filter 232 for the sensor 230 may function in a similar manner but for the light source 228.

In the example of FIG. 2, the vision sensing assemblies 204, 206 may be installed head-to-head. With this arrangement, the light sources 222, 228 are positioned adjacent to each other as shown in FIG. 2. In such examples, the laser lines 214, 218 emitted from the light sources 222, 228 are separated by a distance d (represented by a distance 234 in FIG. 2). In various embodiments, the distance 234 between the laser lines 214, 218 (and more generally, the light sources 222, 228) may be a fixed value of, for example, ten millimeters (mm) or less. For example, the distance 234 may be any suitable value, such as 10 mm, 7 mm, 5 mm, 3 mm, etc. In some examples, it may be desirable to minimize the distance 234 as much as possible. The distance 234 may be determined in various manners. For example, the distance 234 may be determined by a visibility and reflectivity compensation needed between the vision sensing assemblies 204, 206 to achieve an optimized quality for a generated composite image, as further explained below.

As shown in FIG. 2, the workpiece 108 is supported by a conveyor 208. In such examples, the conveyor 208 moves in a linear direction 236 beneath the light sources 222, 228 to cause the workpiece 108 to pass through the laser lines 214, 218. As such, the conveyor 208 moves the workpiece 108 into field of views of the vision sensing assemblies 204, 206. In other examples, the workpiece 108 may remain stationary while the vision sensing assemblies 204, 206 move relative to the workpiece 108, as further explained herein.

In various embodiments, the vision sensing assemblies 204, 206 are generally located in a plane parallel to the workpiece 108. For example, as shown in FIG. 2, the vision sensing assemblies 204, 206 including their light sources 222, 228 are located in a horizontal plane above the workpiece 108. In such examples, the horizontal plane extends generally parallel to a plane in which the workpiece 108 is located. In other words, the horizontal plane extends generally parallel to the conveyor 208 in FIG. 2. While the light sources 222, 228 of FIG. 2 are shown as being in a specific position (e.g., above) relative to the workpiece 108, it should be appreciated that the light sources 222, 228 may be in other locations relative to the workpiece 108 in other embodiments.

As shown in FIG. 2, the vision inspection system 200 further includes a control module 238 in communication with the vision sensing assemblies 204, 206. More specifically, the control module 238 of FIG. 2 transmits control signals 240, 242 to the light sources (e.g., the lasers) 222, 228 and receives signals 244, 246 from the sensors (e.g., the cameras) 224, 230.

In the example of FIG. 2, the control module 238 may trigger the vision sensing assemblies 204, 206 to begin functioning simultaneously. For example, the control module 238 may control the light sources 222, 228 via the control signals 240, 242 to activate at the same time and/or frequency. Additionally, the sensors 224, 230 may be activated at the same time and/or frequency based on the control signals 240, 242.

The control module 238 may generate one or more composite images of the workpiece 108 including laser weld(s) based on data associated with the signals 244, 246. For example, the sensors 224, 230 may collect data for generating independent images (e.g., 3D surface depth map images, etc.) and then provide the data for the images to the control module 238 via the signals 244, 246. Then, the control module 238 may combine the independent images into a composite image (e.g., a 3D surface depth map image, etc.) in any suitable manner. For example, the control module 238 may combine the images based on a relative velocity (v) between the vision sensing assemblies 204, 206 and the workpiece 108 and the distance (d) 234 between the light sources 222, 228. For instance, the sensor 224 may detect reflected light at time T, and the sensor 230 may detect reflected light at a later time. The later time may be T+d/v (e.g., at the time T plus a time for the workpiece 108 to move in the field of view of the vision sensing assembly 206).

Additionally and/or alternatively, the control module 238 may combine the images based on other factors. For example, the control module 238 may combine the images based on the type of material of the workpiece 108. In such examples, depending on the material type, the control module 238 may designate one of the images (e.g., generated by the sensor 224) as a main source for generating the composite image and designate the other image (e.g., generated by the sensor 230) as an auxiliary source for generating the composite image.

For example, when the surface of the workpiece 108 is aluminum, a particular color (e.g., blue) may be better suited for generating images having higher contrast than other colors (e.g., red). In such examples, if the workpiece 108 is or includes aluminum on its surface, the control module 238 may treat the image from the sensor 224 (or another sensor that detects a reflected blue laser) as the controlling or main image source and the image from the sensor 230 as an auxiliary or supplemental image source. With this configuration, the supplemental image source from the sensor 230 may be utilized when the data from the main image source is deficient, such as in the condition of occlusion, shadow effects, etc. Conversely, when the surface of the workpiece 108 is copper, a particular color (e.g., red) may be better suited for generating images than other colors (e.g., blue) because copper has a high absorption ratio for the other colors. As such, if the workpiece 108 is or includes copper on its surface, the control module 238 may treat the image from the sensor 230 (or another sensor that detects a reflected red laser) as the controlling image source and treat the image from the sensor 224 as the supplemental image source (e.g., used for compensation when the data from the main image source is deficient).

In various embodiments, the main-auxiliary relationship may be implemented in other scenarios. For example, in some embodiments the workpiece 108 may include a mixture of materials. In such examples, the control module 238 may still treat an image from one of the vision sensing assemblies 204, 206 as the main image source and another image from the other vision sensing assembly 204, 206 as the supplemental image source. In such examples, the designation may be based on the amounts of the different materials in the workpiece 108, the location of the materials in the workpiece 108, etc. Additionally, in some examples, the designation between the main image source and the supplemental image source may change when scanning the workpiece 108 or between different scans.

In some examples, the control module 238 may implement a weighing function when combining the images. For example, if the workpiece 108 includes a mixture of materials, the control module 238 may treat one of the images as more influential (e.g., more weight applied) than the other image when generating the composite image.

In other examples, the control module 238 may treat both images equally. For example, if the type of material of the workpiece 108 has the same reflectivity characteristics for the different wavelengths (or for different colors), the control module 238 may treat both images equally. In such examples, the control module 238 may combine the images based on the relative velocity and the distance (d) 234, as explained above.

Figure 3:
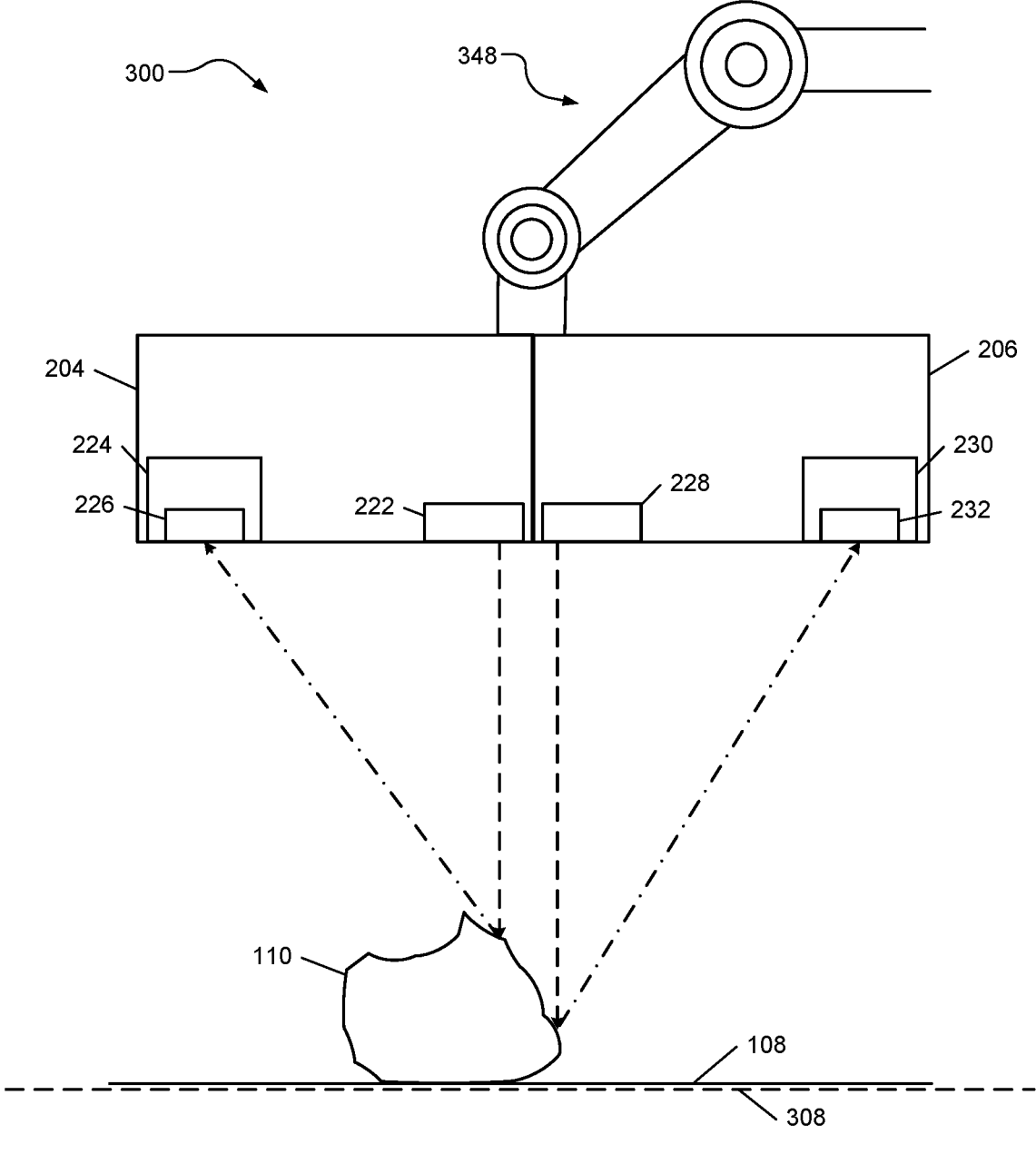
FIG. 3 is a functional block diagram of another example vision inspection system including two vision sensing assemblies and a movable robotic arm, according to the present disclosure.

FIG. 3 depicts an example vision inspection system 300 similar to the vision inspection system 200 of FIG. 2 but includes a robotic arm. For example, the vision inspection system 300 includes the vision sensing assemblies 204, 206 of FIG. 1 with the light sources (e.g., the lasers) 222, 228, the sensors (e.g., the cameras) 224, 230 and the filters 226, 232, and a robotic arm 348 mounted to the vision sensing assemblies 204, 206.

In the example of FIG. 3, the robotic arm 348 is configurable to move the vision sensing assemblies 204, 206 in one or more directions (e.g., in the x, y and/or z directions). In such examples, the robotic arm 348 may be controlled by a control module (e.g., the control module 238 of FIG. 2, etc.) based on one or more inputs, such as user inputs, sensed inputs, etc. With this configuration, the robotic arm 348 can move the vision sensing assemblies 204, 206 over the workpiece 108 having the surface features 110 and that is supported by a platform 308 which may or may not be movable.

Figure 4:
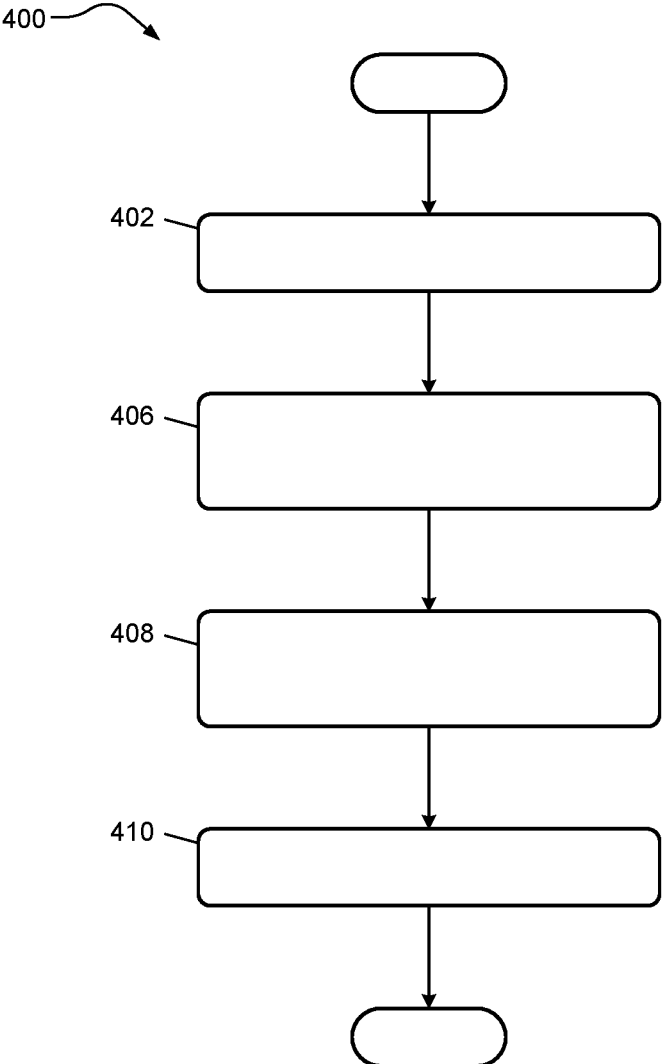
FIGS. 4-5 are flowcharts of example control processes for inspecting welds and/or surface features, according to the present disclosure.
Figure 5:
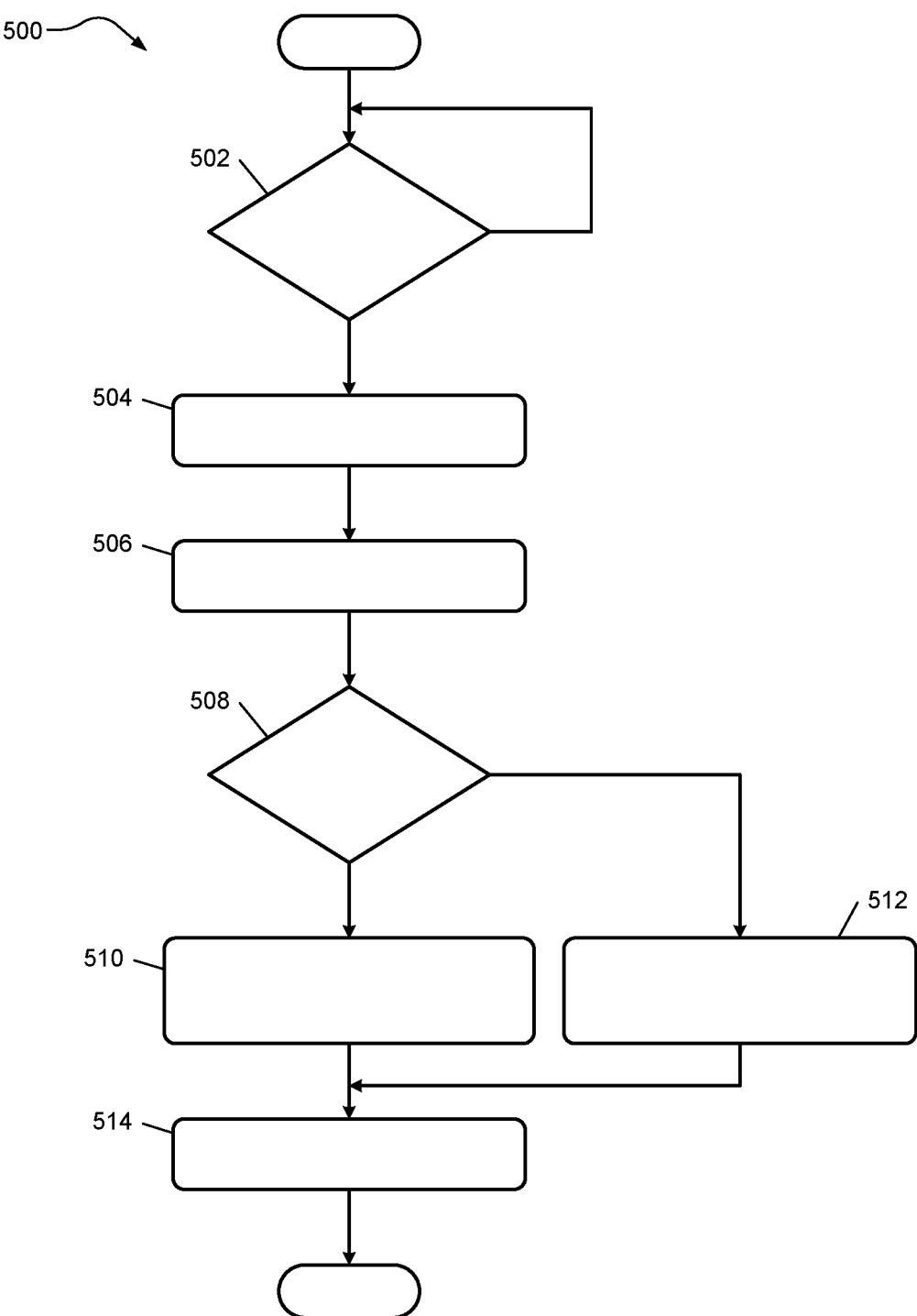

FIGS. 4-5 illustrate example control processes 400, 500 for inspecting welds and/or surface features. In the examples of FIGS. 4-5, the control processes 400, 500 may be implemented with the vision inspection system 200 of FIG. 2. Although the example control processes 400, 500 are described in relation to the vision inspection system 200 of FIG. 2 including the control module 238, any one of the control processes 400, 500 may be employable by another suitable vision inspection system, such as the other vision inspection systems disclosed herein.

In FIG. 4, the control process 400 begins by emitting light from the light source 222 at a first wavelength and emitting light from the light source 228 at a second wavelength different than the first wavelength at 402. For example, and as explained above, the control module 238 of FIG. 2 may trigger the light sources 222, 228 via the control signals 240, 242 to activate at the same time and/or frequency. In doing so, the light sources 222, 228 provide emitted light (e.g., the laser lines 214, 218 of FIG. 2) into fields of view for the workpiece 108 including weld(s) and/or surface features to pass therethrough. Control then proceeds to 406, 408.

At 406, 408, independent images (e.g., image data) are generated with the sensors 224, 230. In such examples, the control module 238 of may trigger the sensors 224, 230 to begin collecting data at the same time and/or frequency. In various embodiments, the sensors 224, 230 may collect data (e.g., based on reflected light from the workpiece 108) for generating the independent images (e.g., 3D surface depth map images, etc.) as the workpiece 108 passes through fields of view of the sensors 224, 230, and then provide the data for the images to the control module 238 via the signals 244, 246. Control then proceeds to 410.

At 410, the control module 238 combines the independent images into a composite image of the workpiece 108 or a region of interest associated with the workpiece 108. In such examples, the control module 238 may combine the independent images (e.g., the data representing the independent images) in any suitable manner, as explained herein. For example, and as explained above, the control module 238 may combine the images based on the type of material(s) present in the workpiece 108, by designating one of the images as a main or controlling source and the other image as an auxiliary or supplemental source, based on a weighing function, etc. Control may then end as shown in FIG. 4 or return to 402 to scan the same workpiece or a different workpiece.

In FIG. 5, the control process 500 begins at 502 by determining whether a trigger signal has been received. If yes, control proceeds to 504. If no, control returns to 502. At 504, one or more surfaces of the workpiece 108 are scanned with the different light sources 222, 228 that emit light at different wavelengths as explained herein. Control then proceeds to 506.

At 506, independent first and second images are obtained with the sensors 224, 230. For example, and as explained above, the sensors 224, 230 may collect data (e.g., reflected light from the workpiece 108) for generating the independent images (e.g., 3D surface depth map images, etc.) as the workpiece 108 passes through fields of view of the sensors 224, 230. Control then proceeds to 508.

At 508, a determination is made as to whether the surface material of the workpiece 108 is a defined material, such as copper, aluminum, etc. In such examples, the control module 238 may receive input indicative of the material(s) of the workpiece surface, such as user input indicating the type(s) of material, input from sensor for detecting the type(s) of material, etc. If the surface material of the workpiece 108 is the same as the defined material, control proceeds to 510 where the control module 238 sets the first image obtained by the sensor 224 to a main image source and sets the second image obtained by the sensor 230 to an auxiliary image source, as explained herein. Conversely, if the surface material of the workpiece 108 is not the same as the defined material, control proceeds to 512 where the control module 238 sets the second image obtained by the sensor 230 to the main image source and sets the first image obtained by the sensor 224 to the auxiliary image source, as explained herein. Control then proceeds to 514.

At 514, the control module 238 combines the independent images into a composite image of the workpiece 108 or a region of interest associated with the workpiece 108, as explained herein. In such examples, the control module 238 combines the independent images based on the set main and auxiliary images sources. With this configuration, the main image source may be used as a master controlling image while the auxiliary image source may be used as necessary for compensation when data from the main image source is deficient. Control may then end as shown in FIG. 5 or return to 502 to scan the same workpiece or a different workpiece.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A vision inspection system for welds and/or surface features, the vision inspection system comprising:

a scanning station to support a workpiece including one or more welds and/or surface features;

a first vision sensing assembly configured to illuminate the workpiece and generate an image of the one or more welds and/or surface features of the workpiece, the first vision sensing assembly including a first light source configured to emit light having a first wavelength towards the workpiece and a first sensor configured to detect the light having the first wavelength reflected by the workpiece;

a second vision sensing assembly configured to illuminate the workpiece and generate an image of the one or more welds and/or surface features of the workpiece, the second vision sensing assembly including a second light source configured to emit light having a second wavelength towards the workpiece and a second sensor configured to detect the light having the second wavelength reflected by the workpiece; and a control module in communication with the first vision sensing assembly and the second vision sensing assembly, the control module configured to control the first light source and the second light source to turn on at the same time, and combine image data from the first sensor and image data from the second sensor based on a relative velocity between the workpiece and the first vision sensing assembly and the second vision sensing assembly, and a distance between the first light source and the second light source, wherein the second wavelength is different than the first wavelength.

2. The vision inspection system of claim 1, wherein the first light source and the second light source are positioned adjacent to each other.

3. The vision inspection system of claim 2, wherein a distance between the first light source and the second light source is a fixed value of ten millimeters or less.

4. The vision inspection system of claim 2, wherein the first light source and the second light source are positioned in a plane extending parallel to the workpiece.

5. The vision inspection system of claim 1, wherein the first light source is a laser configured to emit electromagnetic radiation at the first wavelength.

6. The vision inspection system of claim 5, wherein the laser is a blue laser.

7. The vision inspection system of claim 5, wherein the first sensor includes a camera.

8. The vision inspection system of claim 5, wherein the first sensor includes a filter configured to allow only light at the first wavelength to pass therethrough.

9. The vision inspection system of claim 5, wherein:

the laser is a first laser; and the second light source is a second laser configured to emit electromagnetic radiation at the second wavelength.

10. The vision inspection system of claim 9, wherein the second laser is a red laser.

11. The vision inspection system of claim 9, wherein the second sensor includes a camera.

12. The vision inspection system of claim 9, wherein the second sensor includes a filter configured to allow only light at the second wavelength to pass therethrough.

13. The vision inspection system of claim 1, further comprising a robotic arm mounted to the first vision sensing assembly and the second vision sensing assembly, the robotic arm configured to move the first vision sensing assembly and the second vision sensing assembly over the one or more welds and/or surface features of the workpiece.

14. The vision inspection system of claim 1, further comprising a conveyor configured to move the workpiece into a field of view of the first vision sensing assembly and the second vision sensing assembly.

15. A method for inspecting welds and/or surface features using a first vision sensing assembly including a first light source and a first sensor and a second vision sensing assembly including a second light source and a second sensor, the method comprising:

illuminating a workpiece including one or more welds and/or surface features with light emitted from the first light source having a first wavelength;

illuminating the workpiece with light emitted from the second light source having a second wavelength different than the first wavelength;

generating a first image with the first sensor based on the light having the first wavelength;

generating a second image with the second sensor based on the light having the second wavelength; and combining the first image generated by the first sensor and the second image generated by the second sensor based on a relative velocity between the workpiece and the first vision sensing assembly and the second vision sensing assembly, and a distance between the first light source and the second light source.

16. The method of claim 15, wherein:

the first light source is a laser configured to emit light at the first wavelength;

the second light source is a laser configured to emit light at the second wavelength;

the first sensor includes a camera; and the second sensor includes a camera.

17. The method of claim 15, further comprising:

filtering, via a first filter, the light emitted at the first wavelength; and filtering, via a second filter, the light emitted at the second wavelength.

18. A vision inspection system for welds and/or surface features, the vision inspection system comprising:

a scanning station to support a workpiece including one or more welds and/or surface features;

a first vision sensing assembly configured to illuminate the workpiece and generate an image of the one or more welds and/or surface features of the workpiece, the first vision sensing assembly including a first light source configured to emit light having a first wavelength towards the workpiece and a first sensor configured to detect the light having the first wavelength reflected by the workpiece;

a second vision sensing assembly configured to illuminate the workpiece and generate an image of the one or more welds and/or surface features of the workpiece, the second vision sensing assembly including a second light source configured to emit light having a second wavelength towards the workpiece and a second sensor configured to detect the light having the second wavelength reflected by the workpiece; and a control module in communication with the first vision sensing assembly and the second vision sensing assembly, the control module configured to combine image data from the first sensor and image data from the second sensor based on a relative velocity between the workpiece and the first vision sensing assembly and the second vision sensing assembly, and a distance between the first light source and the second light source wherein the second wavelength is different than the first wavelength.

19. The vision inspection system of claim 18, further comprising a robotic arm mounted to the first vision sensing assembly and the second vision sensing assembly, the robotic arm configured to move the first vision sensing assembly and the second vision sensing assembly over the one or more welds and/or surface features of the workpiece.

20. The vision inspection system of claim 19, further comprising a conveyor configured to move the workpiece into a field of view of the first vision sensing assembly and the second vision sensing assembly.

* * * * *